United States Patent
deCler et al.

(10) Patent No.: US 6,978,800 B2
(45) Date of Patent: Dec. 27, 2005

(54) CLOSURE DEVICE WITH SELF-ALIGNING POPPET

(75) Inventors: Charles Peter deCler, Stillwater, MN (US); Robert K. Johnson, Blaine, MN (US)

(73) Assignee: Colder Products Company, Saint Paul, MN (US)

( * ) Notice: Subject to any disclaimer, the term of this patent is extended or adjusted under 35 U.S.C. 154(b) by 41 days.

(21) Appl. No.: 10/417,678

(22) Filed: Apr. 17, 2003

(65) Prior Publication Data

US 2003/0196703 A1    Oct. 23, 2003

Related U.S. Application Data

(60) Provisional application No. 60/373,569, filed on Apr. 18, 2002.

(51) Int. Cl.[7] ............................................. F16K 15/02
(52) U.S. Cl. .................. 137/540; 137/538; 137/543.19; 137/614.05; 137/800; 251/149.6
(58) Field of Search .................. 137/538, 540, 137/614.04, 614.05, 614.03, 800, 543.13, 137/543.19, 543; 251/149.6, 337

(56) References Cited

U.S. PATENT DOCUMENTS

| | | | | |
|---|---|---|---|---|
| 2,503,349 | A | * | 4/1950 | Mitchell ..................... 401/187 |
| 3,415,299 | A | * | 12/1968 | Hinman, Jr. et al. ........ 206/324 |
| 3,913,615 | A | | 10/1975 | Cooper |
| 4,182,370 | A | * | 1/1980 | Karcher ................. 137/614.04 |
| 4,418,716 | A | * | 12/1983 | Starke ........................ 137/605 |
| 4,538,658 | A | * | 9/1985 | Earley ........................ 152/427 |
| 4,979,721 | A | | 12/1990 | Gilbert |
| 5,193,579 | A | * | 3/1993 | Bauer et al. ................ 137/540 |
| 5,271,429 | A | | 12/1993 | Bauer et al. |
| 5,533,548 | A | | 7/1996 | Grant |

FOREIGN PATENT DOCUMENTS

| | | |
|---|---|---|
| DE | 1 115 540 | 1/1957 |
| DE | 198 09 989 A1 | 9/1999 |
| GB | 756608 | 9/1956 |
| GB | 1 359 859 | 7/1974 |

* cited by examiner

*Primary Examiner*—Ramesh Krishnamurthy
(74) *Attorney, Agent, or Firm*—Merchant & Gould P.C.

(57) ABSTRACT

A closure device used in a fluid dispensing assembly. The closure device contains a housing, a poppet member, and a biasing member. The closure device provides a retaining structure for stabilizing and aligning the poppet member and biasing member within the housing.

11 Claims, 7 Drawing Sheets

CLOSURE DEVICE WITH SELF-ALIGNING POPPET

This application claims the benefit of U.S. Provisional Application Ser. No. 60/373,569, filed Apr. 18, 2002, titled CLOSURE DEVICE WITH SELF-ALIGNING POPPET, which is incorporated herewith by reference in its entirety.

FIELD OF INVENTION

This invention is related to a closure device for fluid dispensing. More particularly, the present invention is related to a closure device with retaining structures having self-stabilizing and self-aligning capabilities.

BACKGROUND OF THE INVENTION

Closure devices used in fluid dispensing assemblies are well known and widely used. These closure devices and fluid dispensing assemblies may be used for fluid dispensing from various bag and box containers, or other flexible containers. Such closures are connected to a coupling that may be attached to a fluid system, for instance a fluid line. Typically, these closures include a valve structure having a housing unit with a poppet and a spring assembled therein, where the closure is actuatable to open a flow passage and enable fluid flow.

However, these closures do not provide structures suitable for stabilizing and aligning the poppet and spring within the housing during assembly and use of the closure. Particularly during assembly, such closures cannot maintain the poppet within an intended region of the flow passage of the housing for opening and closing the closure. Such configurations result in assembly difficulties, for instance improper alignment and positioning of the poppet member. Furthermore, during use, problems may arise as the poppet and spring may be deformed so as to move out of place from its intended position, thereby compromising the seal of the closure in a closed position.

Therefore, there is a need for an improved closure device including a retention structure that stabilizes and aligns the poppet and spring within the housing. Further, a closure is desired that provides a design suitable for high volume manufacture and automated assembly, while resulting in lower cost and higher efficiency.

SUMMARY OF THE INVENTION

In accordance with the present invention, the above and other problems were solved by providing a closure device with a retaining mechanism having self-aligning capabilities.

The present invention is directed to a closure device including a housing and a poppet member. The housing includes a retaining mechanism that cooperates with the poppet member to stabilize and align the poppet member within the housing.

In one embodiment, a closure device includes a housing with a first end and a second end opposite the first end, and an inner sidewall that defines a flow passage extending longitudinally through the first and second ends. A poppet member is disposed within the flow passage, where the poppet member is in fluid communication with the housing. A biasing member is connected to the poppet member. The biasing member biases the poppet member in a normally closed position. The closure device is actuatable from the closed position to an open position through movement of the biasing member and the poppet member. The closure device includes a retaining mechanism connected to the inner sidewall of the housing, where the retaining mechanism stabilizes the poppet member and the biasing member within the housing.

The first end of the housing is adaptable for attachment with a fluid source.

The second end of the housing is adaptable for attachment with a piece of fluid dispensing equipment. Preferably, the piece of fluid dispensing equipment is a mating coupler suitable for engagement with a fluid line.

The housing and the poppet member are in a fluid tight seal when the closure is in the closed position.

In one embodiment of the present invention, the closure device includes a secondary seal connected to the second end of the housing. Preferably, the secondary seal is connected prior to use of the closure device and prior to connection with a piece of fluid dispensing equipment.

In one embodiment of the present invention, the retaining mechanism of the closure device enables self-alignment of the poppet member within the housing.

In another embodiment, the retaining mechanism of the closure device enables auto assembly of the housing, the poppet member, and the biasing member prior to use of the closure device.

In a further embodiment, the closure device may be disposable after one time use.

The present invention provides a closure with retaining structures that stabilize and align the poppet and spring within the housing. Further, the present invention provides a design suitable for high volume manufacture. The closure may be easily assembled by automated means, while resulting in lower cost and higher efficiency.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figures 1, 2:
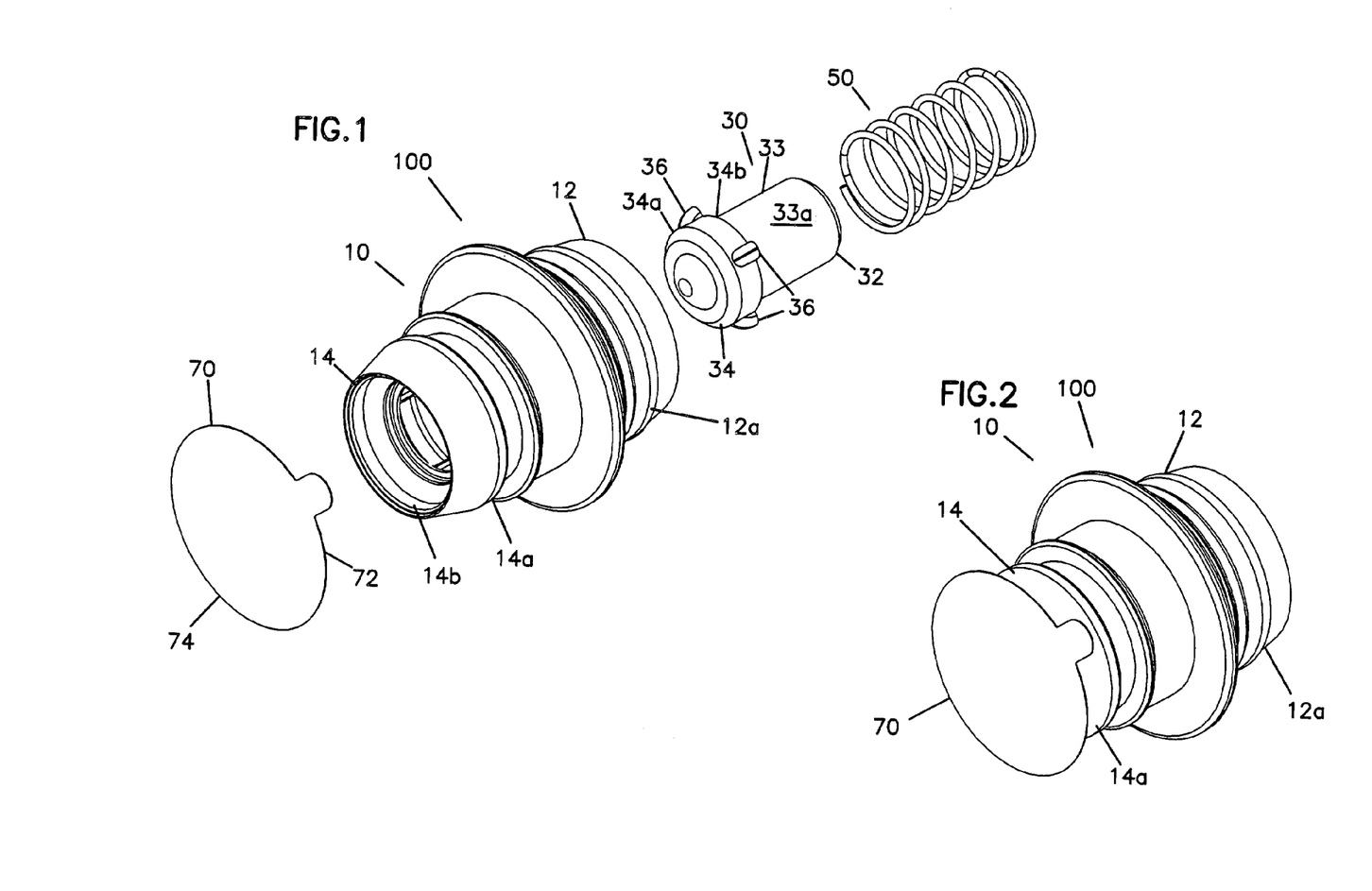
FIG. 1 represents an exploded isometric view of one embodiment a closure device in accordance with the principles of the present invention.
FIG. 2 represents a perspective isometric view of the closure device of FIG. 1 in an assembled state.

FIGS. 1 and 2 illustrate one preferred embodiment of a closure device 100 in exploded and assembled views, respectively. The closure device 100 includes a housing 10, a poppet member 30, and a biasing member 50. The housing 10 includes a first end 12 and a second end 14. An inner sidewall 20 of the housing 10 defines a flow passage 20a (best shown in FIGS. 4 and 4A) extending longitudinally through the first and second ends 12, 14. The flow passage 20a allows fluid flow through the flow passage 20a when the closure device 100 is in an open position. The biasing member 50 biases the poppet member 30 in a normally closed position, where the poppet member 30 and the housing 10 are in a fluid tight seal when in the closed position.

Figure 4:
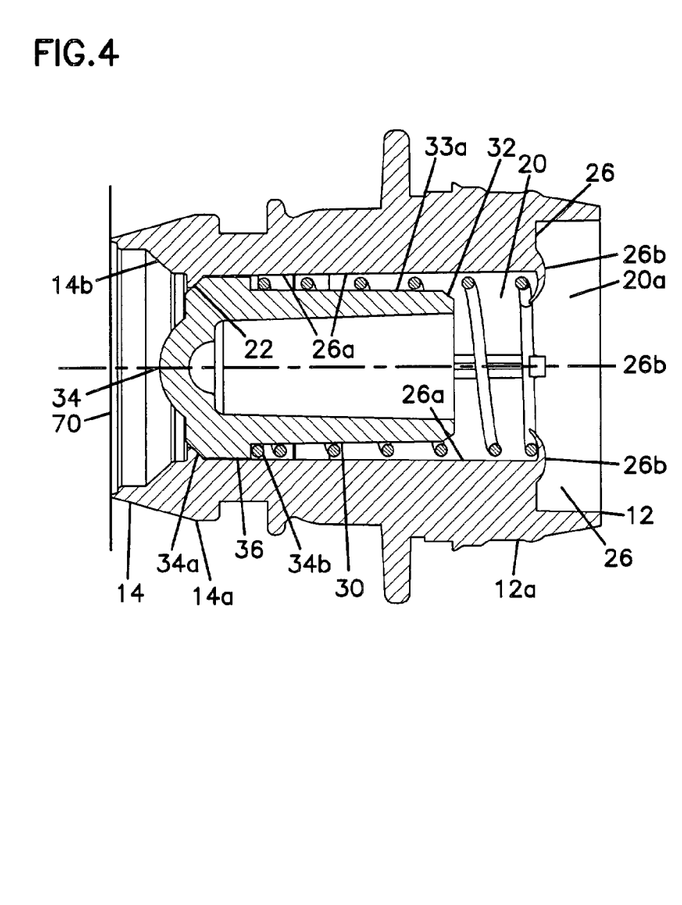
FIG. 4 represents a sectional view of the closure device of FIG. 1 taken from line A—A of FIG. 3 where one embodiment of a poppet member and a biasing member are in a retained position in accordance with the principles of the present invention.
Figure 4A:
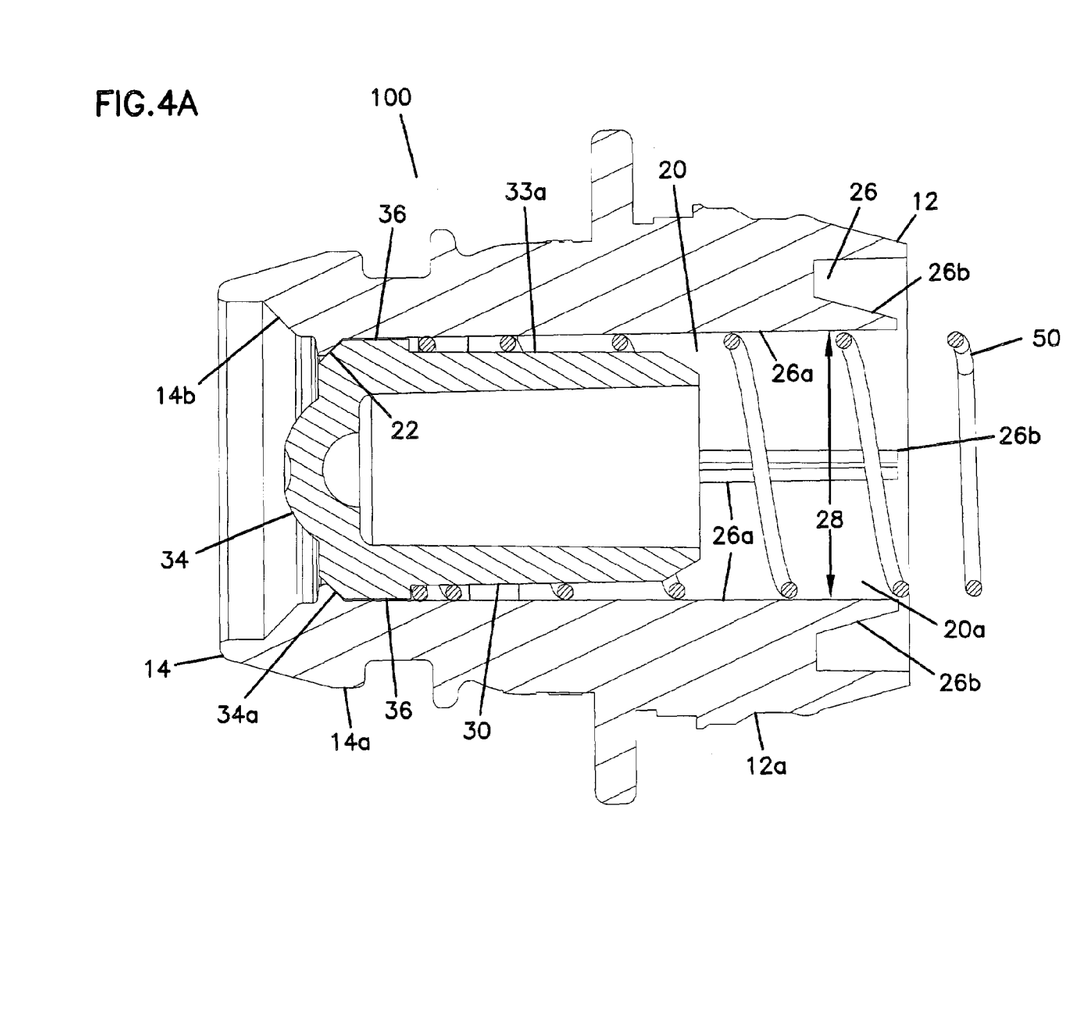
FIG. 4A represents a sectional view of the closure device of FIG. 1 taken from line A—A of FIG. 3 where the poppet member and the biasing member shown before being retained in accordance with the principles of the present invention.

The first end 12 of the housing 10 is suitable for attachment with a fluid source. As shown in FIGS. 1 and 2, the first end 12 includes a ribbed or barbed surface disposed about the outer surface 12a of the first end 12, and is adaptable for attachment with a fluid source. It will be appreciated other configurations may be employed, for instance, a threaded configuration at the outer surface 12a of the first end 12. The second end 14 of the housing 10 is adaptable for attachment with a piece of fluid dispensing equipment. As shown in FIGS. 1 and 2, a barb and recess portion is disposed about the outer surface 14a of the second end 14. Further, the second end 14 defines an inner surface 14b adaptable for connection with a piece of fluid dispensing equipment, such as a mating coupler. As best shown in FIGS. 4 and 4A, a sealing lip 22 is disposed about the inner sidewall 20 of the housing 10 proximate the second end 14, and provides a surface for forming a fluid tight seal with the poppet member 30. Preferably, the sealing lip 22 is disposed opposite the inner surface 14b. More preferably, the sealing lip 22 is tapered.

Figure 3:
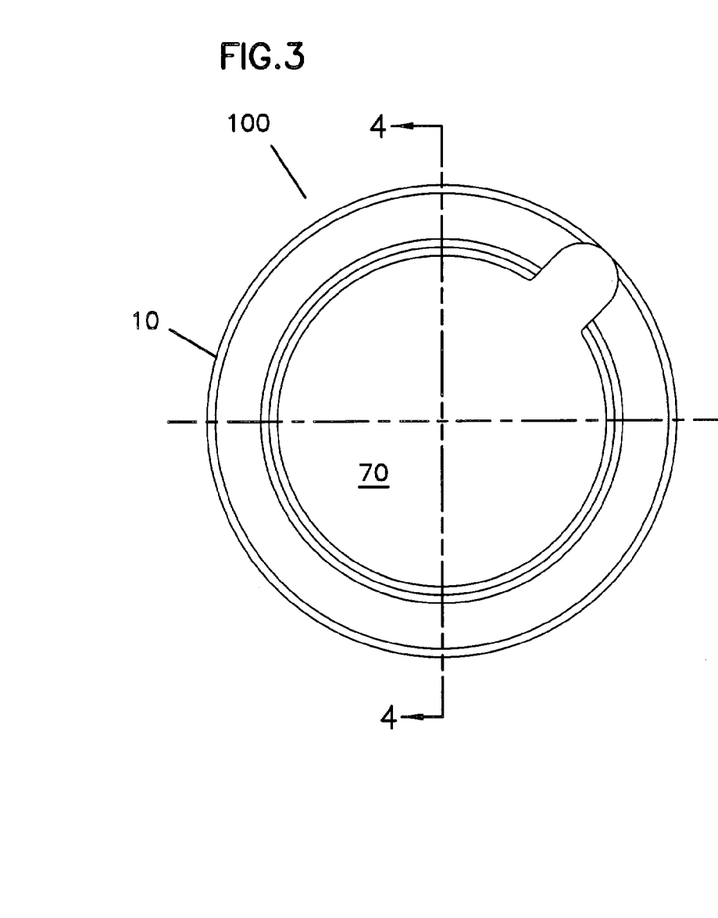
FIG. 3 represents an end view of the closure device of FIG. 1.

FIG. 3 shows an end view of the closure device 100. Further, a secondary seal 70 may be provided with the closure device 100. As best shown in FIGS. 3 and 4, the secondary seal 70 may be removeably attached at the second end 14 of the housing to provide a safety seal. Preferably, the secondary seal 70 is connected to the closure device 100 when the closure device is not in use and prior to connection with a piece of fluid dispensing equipment, such as a mating coupler.

The secondary seal 70 may be an adhesive cover with tear away capabilities. When the closure device 100 is intended for use, the secondary seal 70 is removed from the second end 14 so that the closure device 100 may be connected with a piece of fluid dispensing equipment, such as a mating coupler. Preferably, the secondary seal 70 includes first and second sides 72, 74. The first side 72 may be a plastic material, while the second side 74 may be a metal material. The secondary seal 70 may be applied to the second end 14 of the housing 10 by a thermal induction or weld process, where heat is applied to the secondary seal at the second side 74 to weld the first side 72 to the first end 14 of the housing 10. In this way, the secondary seal 70 is tamper evident, where if the secondary seal 70 is broken, peeled, or removed in any way prior to actual use, an intended user would be indicated of such a situation. Preferably, heat is applied to the metal material on the second side 74, thereby melting the plastic material of the first side 72 onto the housing 10. It will be appreciated other configurations and methods may be employed for applying a secondary seal to the housing. For example, a cap or other suitable covers may be used.

Figure 1A:
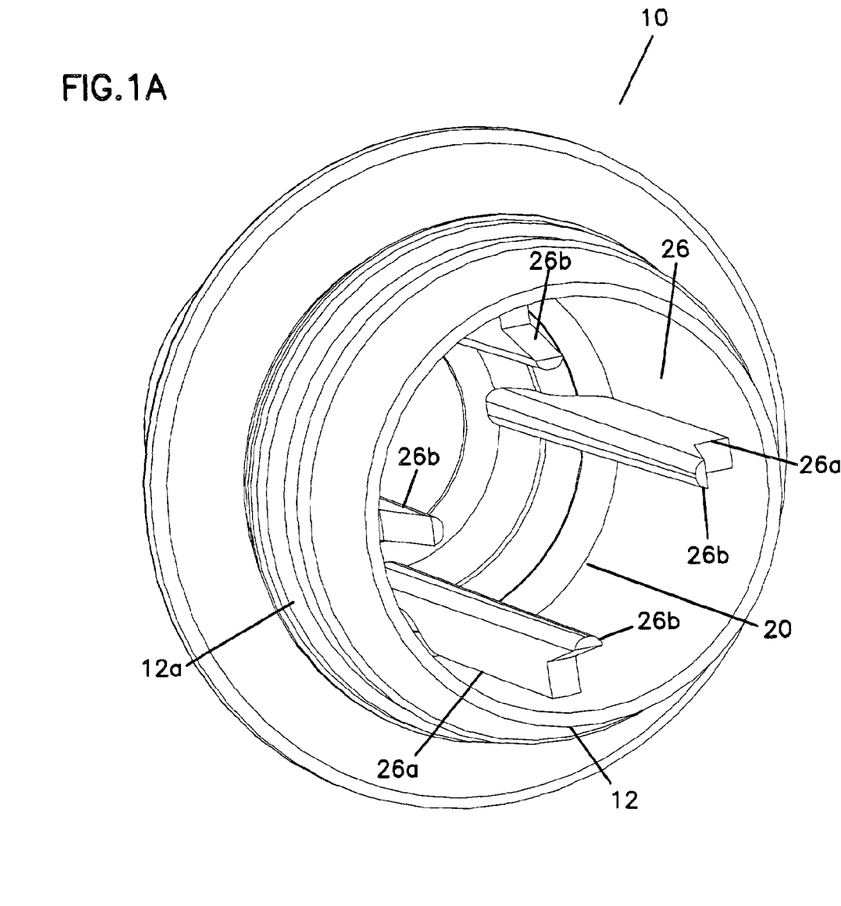
FIG. 1A represents a perspective view of one embodiment of the housing of the closure device of FIG. 1 in accordance with the principles of the present invention.

As best shown in FIG. 4, the inner sidewall 20 of the housing 10 includes a retaining mechanism 26 having a plurality of elongated members 26a. The elongated members resemble ribbed portions disposed along the inner sidewall 20 and extend longitudinally between the first and second ends 12, 14. Preferably, four elongated members 26a are arranged as oppositely disposed pairs, where one pair is orthogonal to the other pair, as best shown in FIG. 1A. The function of the elongated members 26a is detailed below. It will be appreciated that other configurations of the elongated members may also be employed. In addition, the number of elongated members may vary, as more or less than four elongated members may be used. For instance, 3 pairs of elongated members (6 total) may be employed, or a total of 3 elongated members may be used, which are disposed radially equidistant from each other about a circumference defined by the inner sidewall 20 of the housing 10.

Figure 5:
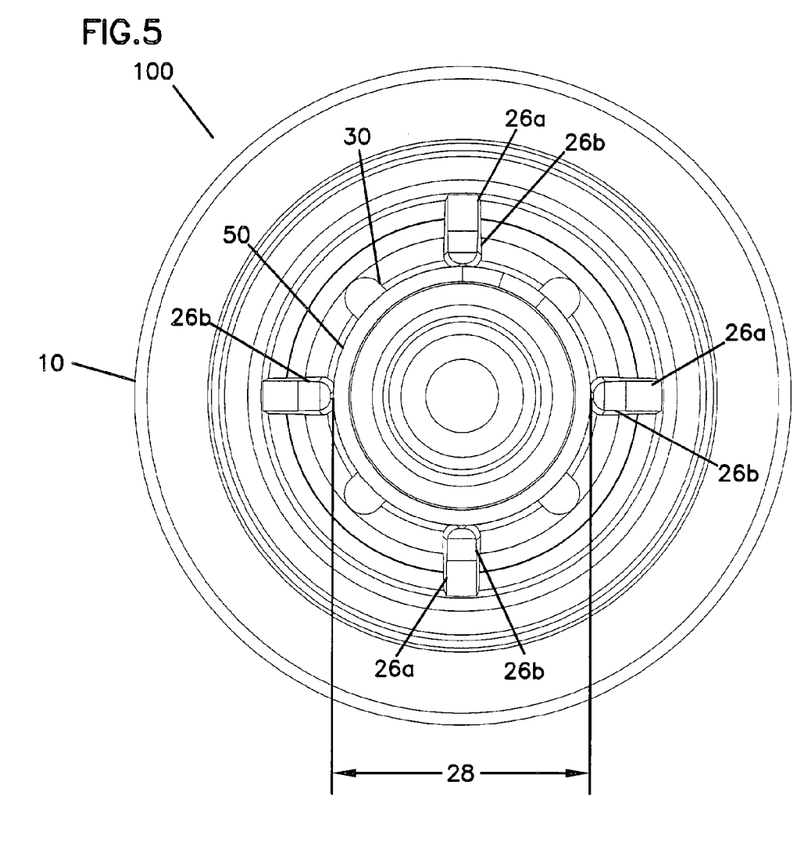
FIG. 5 represents an end view of the closure device of FIG. 1 opposite of the end view of FIG. 3.

The retaining mechanism 26 provides stabilizing and alignment capability to the housing 10 for holding the poppet member 30 and biasing member 50 in place. As illustrated in FIG. 5, the elongated members 26a define a diameter 28 larger than a diameter defined by outer surfaces of the poppet member 30 and biasing member 50. Preferably, the diameter 28 of the elongated members 26a is large enough to allow insertion of the poppet member 30 and biasing member 50 into the housing 10. This configuration enables the poppet member 30 and the biasing member 50 to comfortably move along the flow passage 20a of the housing 10, when actuated, without causing excessive interference due to contact with the poppet and biasing members 30, 50. The elongated members 26a hold the poppet and biasing members 30, 50 to a limited space defined substantially within the diameter 28 of the elongated members 26a, and provide a structure for the poppet and biasing members 30, 50 to be self-stabilized in the housing 10. In this configuration, the poppet and biasing members 30, 50 are maintained along a desired position of the flow passage 20. Further, the poppet and biasing members 30, 50 are not deformed or deflected out of position, which may damage the integrity of the seal between the poppet member 50 and the housing 10.

The elongated members 26a of the retaining mechanism 26 further include retaining tabs 26b disposed at ends of the elongated members 26a proximate the first end 12 of the housing 10. Preferably, before assembly of the coupling device 100, the retaining tabs 26b are in an undeflected position. As shown in FIG. 4A, the retaining tabs 26b extend outwardly from the end of each elongated member 26a and are coaxial with the flow passage 20 in an undeflected position. In assembly of the closure device 100, the poppet member 30 may be inserted into the housing 10 together with the biasing member 50. It will also be appreciated that the poppet member 30 may be first inserted into the housing 10, with insertion of the biasing member 50 thereafter. The retaining tabs 26b are deformed or deflected so as to retain the poppet member 30 and the biasing member within the housing 10. As best shown in FIG. 4, the retaining members 26b are formed over a portion of the biasing member 50 at one end. Further, the retaining members 26b provide a seating surface for the biasing member to rest against when deflected to a retaining position. Preferably, heat is used in an ultrasonic staking or welding process that reforms the retaining tabs 26b into the retaining position (i.e. formation over the biasing member 50). The housing 10 may be formed of an injection moldable plastic material, such as polypropylene.

The poppet member 30 includes a first end 32 and a second end 34. An elongated portion 33 defines an outer sidewall 33a. The second end 34 includes a sealing surface 34a that communicates with the sealing lip 22 of the housing 10. Preferably, the sealing surface 34a is tapered and in cooperation with the tapered sealing lip 22 forming a face to face seal between the housing 10 and the poppet member 30. As above, the biasing member 50 biases the poppet member 30 in a normally closed position, thereby providing the necessary force of the sealing surface 34b against the sealing lip 22 of the housing 10. Further, the second end 34 includes a stop portion 34b, where the outer sidewall 33a and the stop portion 34b enable the biasing member 50 to fit partially over the poppet member 30. A plurality of protrusions 36 are disposed proximate the second end 34 of the poppet member 30. The protrusions 36 cooperate with the elongated members 26a of the retaining mechanism 26 so as to align and stabilize the poppet member 30 and biasing member 50 within the housing 10. Particularly, the protrusions 36 may contact the elongated members 26a to limit rotation and movement of the poppet member 30. Further, the protrusions 36 provide locating capabilities for proper insertion of the poppet member 30 into the housing 10. The poppet member 30 may be constructed of a rubber material or thermoplastic elastomer.

The biasing member 50 may be a coiled spring where the poppet member 30 may be partially inserted into the opening defined by the coil of the spring. The stop portion 34b of the poppet member 30 limits the insertion of the poppet member 30 within the biasing member 50. Preferably, the coil spring is a metal material. It will be appreciated that other biasing members may be employed to achieve the same result.

Figure 6:
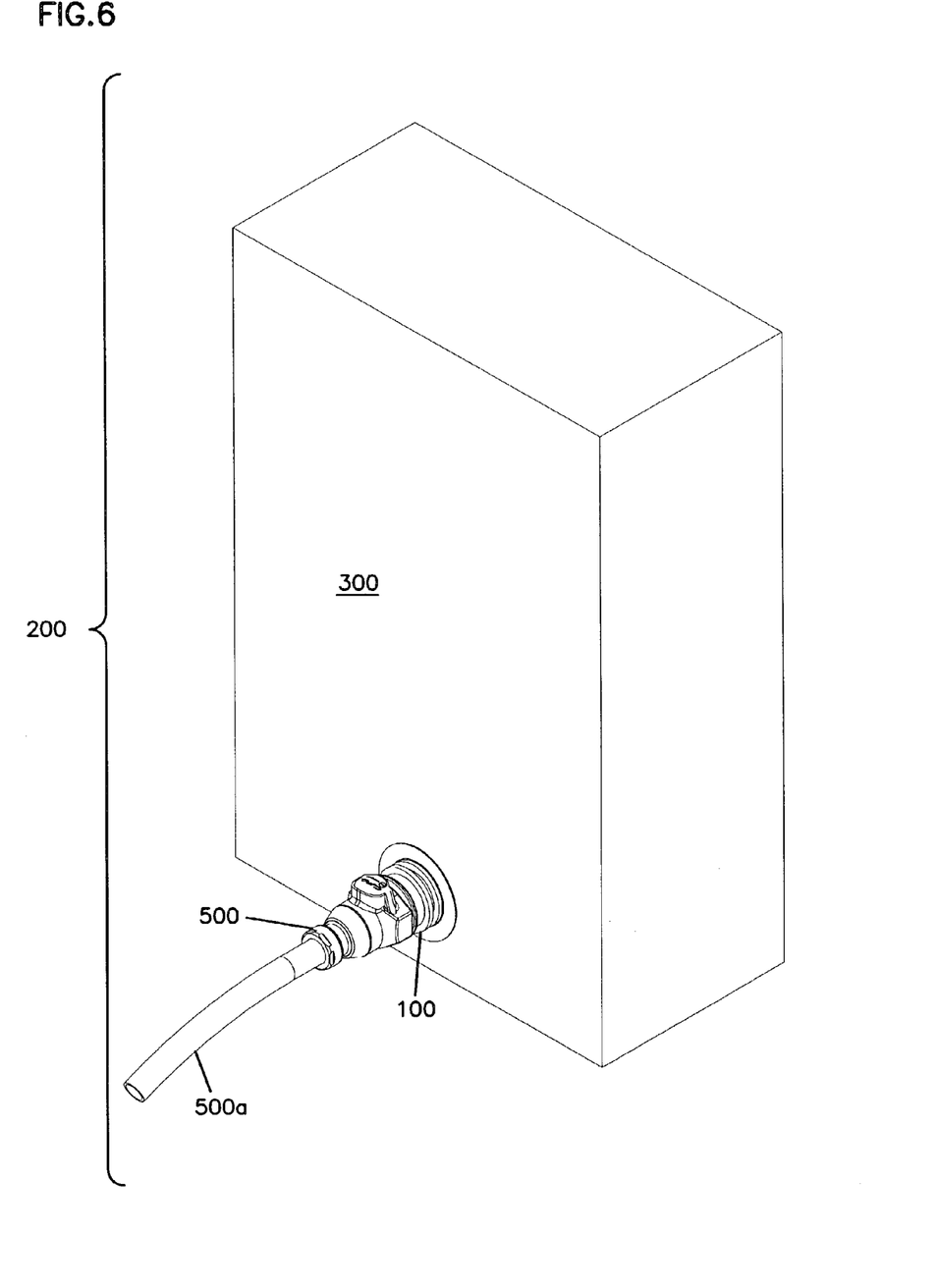
FIG. 6 represents a schematic view of the closure device of FIG. 1 incorporated within one embodiment of a fluid dispensing system in accordance with the principles of the present invention.

FIG. 6 illustrates one example of the closure device 100 incorporated in a fluid dispensing system 200. A fluid source 300 may be a bag, box, or other flexible container. As above, the closure device 100 is connected to the fluid source 300 at the first end 12. A mating coupler 500 and associated fluid line 500a are connected to the second end 14 of the closure device 100.

Figure 7:
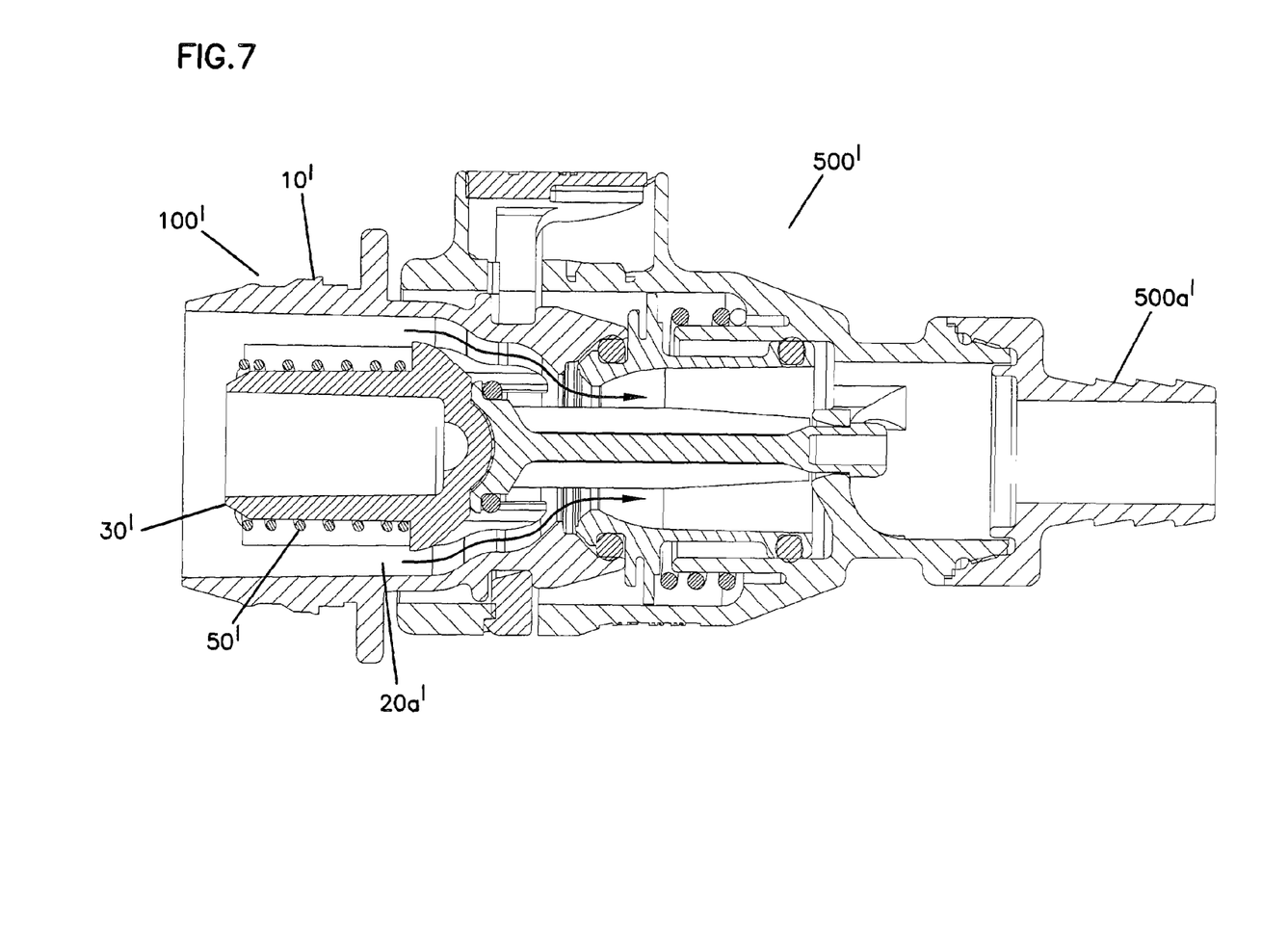
FIG. 7 represents a sectional view of another embodiment of the closure device connected with one embodiment of a coupler and positioned in the open position in accordance with the principles of the present invention.

FIG. 7 illustrates a sectional view of a closure device 100' connected with one embodiment of a coupler 500'. The closure device and its components substantially correspond with components of the closure device 100, and the structures thereof are not further discussed. The closure device 100' is shown in the open position, where the poppet member 30' is longitudinally displaced and the biasing member 50' is compressed so as to open the fluid tight seal between the poppet member 30' and the housing 10'. In the open position, fluid is permitted to flow through the flow passage 20a' to a connected fluid dispensing system, for example the coupler 500' and the fluid line 500a'. The closure device 100 in FIGS. 1–6 operates in the same manner as illustrated in the closure device 100'.

As above, the present invention provides a closure with retaining structures that stabilize and align the poppet member and biasing member within the housing. Particularly, the retaining mechanism enables self-alignment of the poppet member and biasing member during assembly and use of the closure device. Further, the present invention provides a design suitable for high volume manufacture. The closure may be easily assembled by automated means, while resulting in lower cost and higher efficiency.

Having described the embodiments of the present invention, modifications and equivalents may occur to one skilled in the art. It is intended that such modifications and equivalents shall be included with the scope of the invention.

We claim:

1. A closure device, comprising:
   a housing including a first end and a second end opposite said first end, an inner sidewall defining a flow passage extending longitudinally through said first and second ends;
   a poppet member disposed within said flow passage, said poppet member being in fluid communication with said housing;
   a biasing member connected to said poppet member, said biasing member biasing said poppet member in a closed position, wherein said closure device is actuatable from said closed position to an open position through said biasing member and said poppet member; and
   a retaining mechanism connected to said inner sidewall of said housing, said retaining mechanism including a plurality of elongated members disposed along the inner sidewall and extending longitudinally between the first and second ends, said elongated members defining a diameter within said housing and stabilizing said poppet member and said biasing member within said diameter;
   wherein said elongated members each include a retaining tab disposed at an end proximate said first end of said housing, each retaining tab moving between an undeflected position wherein the retaining tab is coaxial with the flow passage of the housing, and a deflected position wherein the retaining tab extends over a portion of said biasing member.

2. The closure device according to claim 1, wherein said first end of said housing being adaptable for attachment with a fluid source.

3. The closure device according to claim 1, wherein said second end of said housing being adaptable for attachment with a piece of fluid dispensing equipment.

4. The closure device according to claim 1, wherein said second end of said housing including a secondary seal removeably connected to said second end, said secondary seal being removable when said closure device is connected to a piece of fluid dispensing equipment.

5. The closure device according to claim 1, wherein said housing and said poppet member being in a fluid tight seal when said closure device is in said closed position.

6. The closure device according to claim 1, wherein said retaining mechanism enabling self-alignment of said popper member within said housing.

7. The closure device according to claim 1, wherein said retaining mechanism enabling auto assembly of said housing, said poppet member, and said biasing member prior to use of said closure device.

8. The closure device according to claim 1, wherein said closure device being disposable after one time use.

9. The closure device according to claim 1, wherein said poppet member is constructed of a thermoplastic elastomer material.

10. A closure device, comprising:
a housing including a first end and a second end opposite said first end, an inner sidewall defining a flow passage extending longitudinally through said first and second ends;
a poppet member disposed within said flow passage, said poppet member being in fluid communication with said housing;
a biasing member connected to said poppet member, said biasing member biasing said poppet member in a closed position, wherein said closure device is actuatable from said closed position to an open position through said biasing member and said poppet member;
a retaining mechanism connected to said inner sidewall of said housing, said retaining mechanism including a plurality of elongated members disposed along the inner sidewall and extending longitudinally between the first and second ends, said elongated members defining a diameter within said housing and stabilizing said poppet member and said biasing member within said diameter; and
a secondary seal removeably connected to said second end of the housing, said secondary seal being removable when said closure device is connected to a piece of fluid dispensing equipment wherein said secondary seal is an adhesive cover;
wherein said elongated members each include a retaining tab disposed at an end proximate said first end of said housing each retaining tab moving between an undeflected position wherein the retaining tab is coaxial with the flow passage of the housing, and a deflected position wherein the retaining tab extends over a portion of said biasing member.

11. A fluid dispensing system, comprising:
a fluid container; and
a closure device coupled to the fluid container, the closure device comprising:
a housing including a first end and a second end opposite said first end, an inner sidewall defining a flow passage extending longitudinally through said first and second ends;
a poppet member disposed within said flow passage, said poppet member being in fluid communication with said housing;
a biasing member connected to said poppet member, said biasing member biasing said poppet member in a closed position, wherein said closure device is actuatable from said closed position to an open position through said biasing member and said poppet member; and
a retaining mechanism connected to said inner sidewall of said housing said retaining mechanism including a plurality of elongated members disposed along the inner sidewall and extending longitudinally between the first and second ends, said elongated members defining a diameter within said housing and stabilizing said poppet member and said biasing member within said diameter;
wherein said elongated members each include a retaining tab disposed at an end proximate said first end of said housing, each retaining tab moving between an undeflected position wherein the retaining tab is coaxial with the flow passage of the housing, and a deflected position wherein the retaining tab extends over a portion of said biasing member.

* * * * *